United States Patent
Yoshimura et al.

(10) Patent No.: US 11,043,718 B2
(45) Date of Patent: Jun. 22, 2021

(54) POROUS POLYIMIDE FILM AND BATTERY

(71) Applicant: FUJIFILM BUSINESS INNOVATION CORP., Tokyo (JP)

(72) Inventors: Kosaku Yoshimura, Kanagawa (JP); Yasunobu Kashima, Kanagawa (JP); Hajime Sugahara, Kanagawa (JP); Hidekazu Hirose, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 16/561,511

(22) Filed: Sep. 5, 2019

(65) Prior Publication Data
US 2020/0266409 A1    Aug. 20, 2020

(30) Foreign Application Priority Data

Feb. 14, 2019  (JP) .............................. JP2019-024757

(51) Int. Cl.
*H01M 2/16* (2006.01)
*H01M 10/0525* (2010.01)
*H01M 10/0562* (2010.01)
*C08J 9/26* (2006.01)
*H01M 50/411* (2021.01)

(52) U.S. Cl.
CPC ............. *H01M 50/411* (2021.01); *C08J 9/26* (2013.01); *H01M 10/0525* (2013.01); *C08J 2379/08* (2013.01)

(58) Field of Classification Search
CPC . H01M 2/1653; H01M 10/0525; Y02E 60/10; C08J 9/26; C08J 2201/046; C08J 2379/08
See application file for complete search history.

(56) References Cited

U.S. PATENT DOCUMENTS

2010/0255380 A1* 10/2010 Baba .................... H01M 2/1686
429/246
2017/0256766 A1* 9/2017 Tobari ................ B01D 67/0006

FOREIGN PATENT DOCUMENTS

| JP | 2008-047456 | * | 2/2008 |
| JP | 5294088 B2 | | 9/2013 |
| WO | 2016/125832 A1 | | 8/2016 |

OTHER PUBLICATIONS

English translation of JP Publication 2008-047456, Feb. 2008.*

* cited by examiner

*Primary Examiner* — Brittany L Raymond
(74) *Attorney, Agent, or Firm* — Oliff PLC

(57) ABSTRACT

A porous polyimide film has an acid value within a range of 7 mgKOH/g to 20 mgKOH/g determined by acid-base titration, contains a metal group including alkali metals excluding Li, an alkaline earth metals, and silicon at a total content of 100 ppm or less relative to the porous polyimide film, and has a moisture absorption ratio of 0.5% or less.

14 Claims, 3 Drawing Sheets

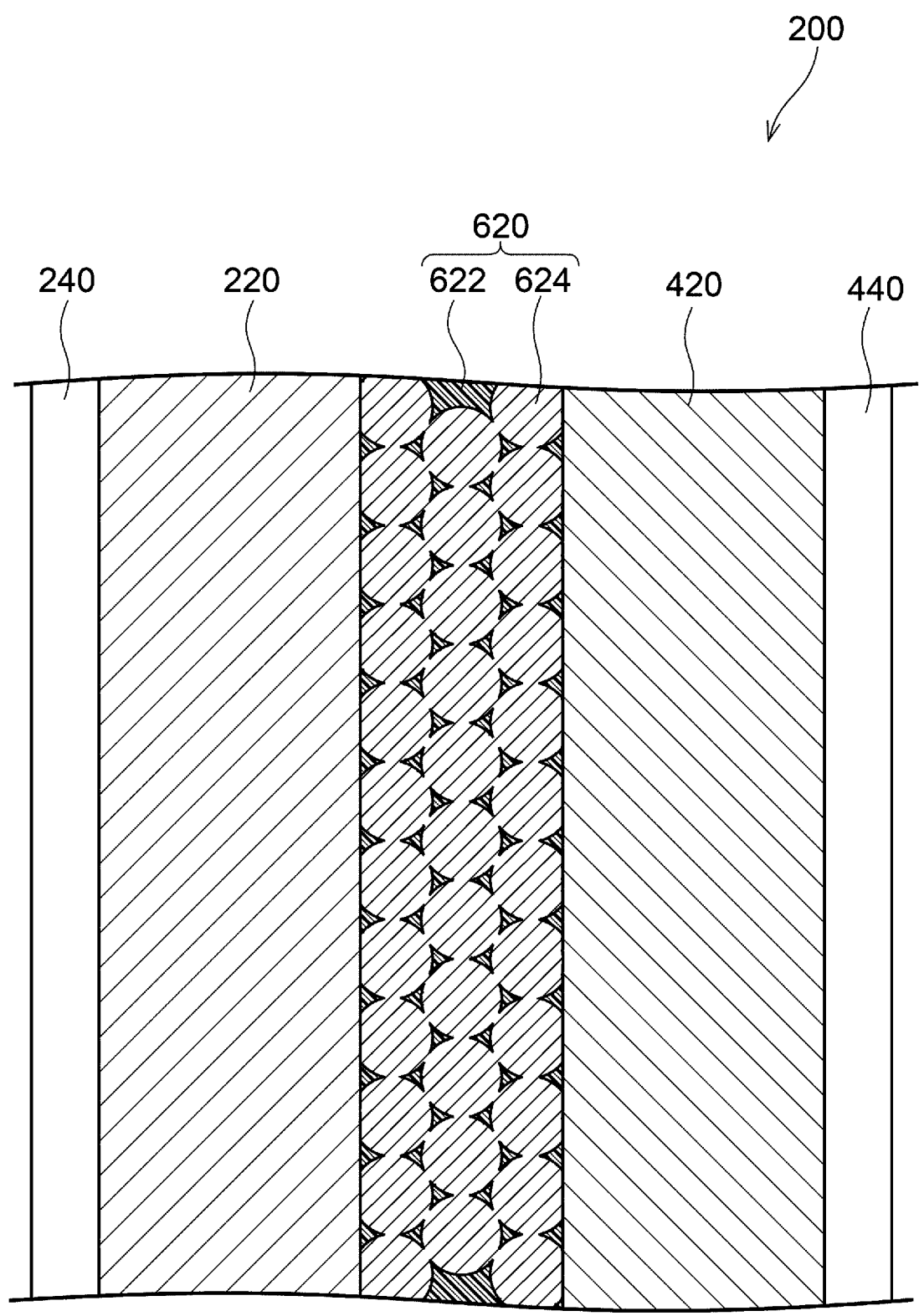

POROUS POLYIMIDE FILM AND BATTERY

CROSS-REFERENCE TO RELATED APPLICATIONS

This application is based on and claims priority under 35 USC 119 from Japanese Patent Application No. 2019-024757 filed Feb. 14, 2019.

BACKGROUND

(i) Technical Field

The present disclosure relates to a porous polyimide film and a battery.

(ii) Related Art

Polyimide films are materials having excellent characteristics such as mechanical strength, chemical stability, and heat resistance, and porous polyimide films having these characteristics attract attention.

Porous polyimide films may be applied to uses for filters (a filtration filter, an oil filter, a fuel filter, and the like), uses for secondary batteries (a separator for a lithium ion secondary battery, a holding body for a solid electrolyte of an all-solid-state battery, and the like) etc.

For example, International Publication No. 2016/125832 discloses a polyimide and/or polyamide-imide porous material containing polyimide and/or polyamide-imide which has at least one selected from the group consisting of a carboxyl group, a salt-type carboxyl group, and a —NH— bond.

Also, Japanese Patent No. 5294088 discloses a separator for a nonaqueous electrolyte battery, the separator being used for a nonaqueous electrolyte battery and including a porous layer which contains inorganic particles and a resin binder and is provided on a porous separator substrate. The resin binder is composed of at least one selected from the group consisting of a polyimide resin and a polyamide-imide resin, the resin has an acid value of 5.6 mgKOH/g to 28.0 mgKOH/g and a logarithmic viscosity of 0.5 to 1.5 dl/g, and the content of the resin binder in the porous layer is 5% by mass or more.

SUMMARY

A porous polyimide film is generally formed by various methods. The resultant porous polyimide film having a low acid value tends to repel water, an organic solvent, and the like. When such a porous polyimide film having low wettability is used as, for example, a filter, the filtration efficiency may be decreased, while when used as, for example, a separator for a battery, the permeability of an electrolyte may be decreased. On the other hand, the porous polyimide film produced through chemical etching (for example, alkali treatment) has a high acid value and thus has good wettability, but there is the tendency to increase moisture absorbability of the porous polyimide film and decrease strength thereof. When such a porous polyimide film is used as, for example, a filter, reproducibility of products may be decreased, while when used as, for example, a separator for a battery, adaptability for a battery may be decreased.

Aspects of non-limiting embodiments of the present disclosure relate to a porous polyimide film having good wettability and high strength as compared with when the acid value of a porous polyimide film determined by acid-base titration is less than 7 mgKOH/g or exceeds 20 mgKOH/g, when the molar ratio (structural unit derived from tetracarboxylic dianhydride/structural unit derived from diamine) of the structural unit derived from tetracarboxylic dianhydride to the structural unit derived from diamine, both constituting a polyimide resin of a porous polyimide film, is less than 1.00 or exceeds 1.15, when the total content of a metal group including alkali metals excluding Li, alkaline earth metals, and silicon exceeds 100 ppm, or when the moisture absorption ratio exceeds 0.5%.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a porous polyimide having an acid value of 7 mgKOH/g or more and 20 mgKOH/g or less determined by acid-base titration, containing a metal group, which includes alkali metals excluding Li, alkaline earth metals, and silicon, at a total content of 100 ppm or less relative to the porous polyimide film, and having a moisture absorption ratio of 0.5% or less.

BRIEF DESCRIPTION OF THE DRAWINGS

Exemplary embodiments of the present disclosure will be described in detail based on the following figures, wherein:

FIG. 3 is a schematic partial sectional view showing an example of an all-solid-state battery according to an exemplary embodiment of the present disclosure.

DETAILED DESCRIPTION

Figure 1:
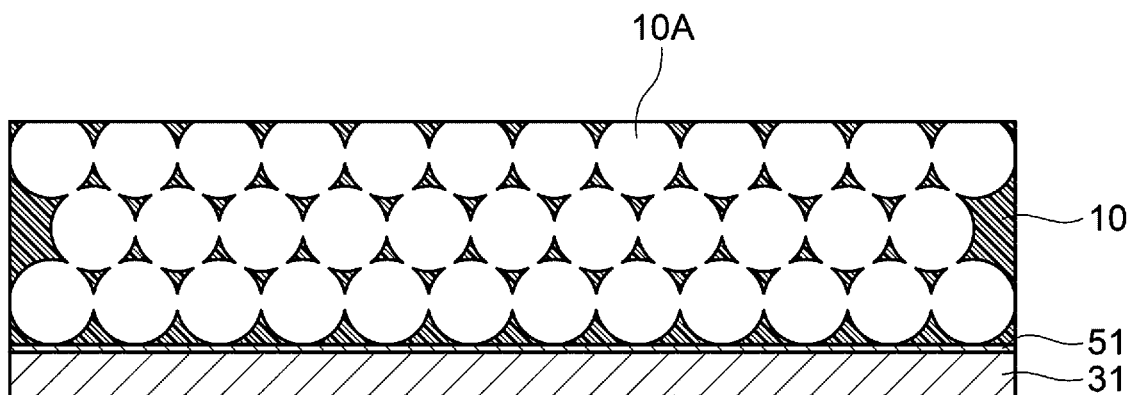
FIG. 1 is a schematic drawing showing an example of a form of a porous polyimide film according to an exemplary embodiment of the present disclosure.

A porous polyimide film according to an exemplary embodiment of the present disclosure is described below by giving two exemplary embodiments ("first exemplary embodiment" and "second exemplary embodiment"). In addition, the two exemplary embodiments are also referred to, in combination, as the "exemplary embodiment of the present disclosure".

<Porous Polyimide Film>

First Exemplary Embodiment

A porous polyimide film according to the first exemplary embodiment has an acid value of 7 mgKOH/g or more and 20 mgKOH/g or less determined by acid-base titration, contains a metal group (also referred to as a "specific metal group" hereinafter) including alkali metals excluding Li, alkaline earth metals, and silicon at a total content of 100 ppm or less relative to the porous polyimide film, and has a moisture absorption ratio of 0.5% or less.

Second Exemplary Embodiment

A porous polyimide film according to the second exemplary embodiment has a molar ratio (structural unit derived from tetracarboxylic dianhydride/structural unit derived from diamine) of 1.00 or more and 1.15 or less which is the molar ratio of the structural unit derived from tetracarboxylic dianhydride to the structural unit derived from diamine, both constituting a polyimide resin of the porous polyimide film, contains a metal group (also referred to as a "specific metal group" hereinafter) including alkali metals excluding Li, alkaline earth metals, and silicon at a total content of 100 ppm or less relative to the porous polyimide film, and has a moisture absorption ratio of 0.5% or less.

The porous polyimide film according to the exemplary embodiment of the present disclosure has the configuration described above and thus can provide a porous polyimide film having good wettability and high strength. The reason for this is unknown, but is supposed as follows.

In the specification of the present disclosure, "ppm" is on mass basis.

The porous polyimide film according to the exemplary embodiment of the present disclosure has an acid value of 7 mgKOH/g or more or has a molar ratio of 1.00 or more, which is the molar ratio of the structural unit derived from tetracarboxylic dianhydride to the structural unit derived from diamine, both constituting a polyimide resin of the porous polyimide film. Therefore, it is considered that the acid groups of the porous polyimide film are sufficiently exposed, thereby causing good wettability. Also, the total content of the specific metal group is 100 ppm or less, and thus the porous polyimide film according to the exemplary embodiment of the present disclosure is considered to have high strength.

Further, the porous polyimide film according to the exemplary embodiment of the present disclosure has a moisture absorption ratio of 0.5% or less and is thus considered to be hardly swelled during use of the porous polyimide and to have stable strength even in high-humidity environment.

A conceivable reason why a usual porous polyimide film contains the specific metal group at a total content exceeding 100 ppm is, for example, as follows.

For example, in order to improve wettability, the surface of a porous polyimide film may be treated by a chemical etching method so as to ring-open imide bonds on the surface of the porous polyimide film and to expose more acid groups in the surface of the film. The chemical etching method uses a chemical etchant such as an inorganic alkali solution, an organic alkali solution, or the like, and thus the specific metal group contained in the chemical etchant remains on the porous polyimide film after ring-opening treatment of the imide bonds on the surface of the porous polyimide film.

On the other hand, the porous polyimide film according to the exemplary embodiment of the present disclosure contains the specific metal group at a total content of 100 ppm or less relative to the porous polyimide film. From the viewpoint of improving the strength of the porous polyimide film, the total content is preferably 50 ppm or less and more preferably 20 ppm or less. The total content of the specific metal group relative to the porous polyimide film is preferably as low as possible and more preferably 0 ppm. The lower limit value may be 1.0 ppm or move. The content of "0 ppm" represents a detection limit or less.

For example, when the porous polyimide film according to the exemplary embodiment of the present disclosure is applied as a separator for a battery (for example, a separator for a lithium ion secondary battery), with the total content of the specific metal group within the range described above, a decrease in cycle characteristics is supposed to be suppressed due to a low content of metal species which are considered to cause disturbance in the flow of ions permeating through the porous polyimide film.

The total content of the specific metal group contained in the porous polyimide film is measured by an atomic absorption analyzer for the porous polyimide film to be measured.

A method for adjusting the total content of the specific metal group contained in the porous polyimide film is not particularly limited, but the content of the specific metal group can be suppressed to be 100 ppm or less without performing at least chemical etching because the specific metal group is considered to be mixed in the film by chemical etching. Also, an example of a conceivable method is to decrease the total content of the specific metal group contained in the resin particles used for a polyimide precursor solution described later.

The porous polyimide film according to the exemplary embodiment of the present disclosure is described in further detail below.

In the exemplary embodiment of the present disclosure, the concept of "film" includes not only those generally called "film" but also those generally called "film" and "sheet".

The porous polyimide film according to the first exemplary embodiment has an acid value of 7 mgKOH/g or more and 20 mgKOH/g or less, determined by acid-base titration.

From the viewpoint of improving strength and wettability of the porous polyimide film, the acid value of the porous polyimide film is preferably 10 mgKOH/g or more and 20 mgKOH/g or less and more preferably 12 mgKOH/g or more and 20 mgKOH/g or less.

The acid value of the porous polyimide film can be adjusted within the range described above by adjusting the mixing ratio of a monomer containing an acid group, which forms the porous polyimide film.

When the acid value of the porous polyimide film according to the exemplary embodiment of the present disclosure is within the range described above, not only the acid value of the surface of the porous polyimide film but also the acid value of the wall surfaces of pores of the film are considered to fall within the same range. The acid value of the porous polyimide film is defined by the following measurement method.

The acid value is defined by the mass (mg) of KOH required for completely neutralizing 1 g of the porous polyimide film, and the value measured by the method described in JIS standard (JIS K0070, 1992) is used. The porous polyimide film is not dissolved in a solvent and is thus measured in a suspension state.

Also, the degree of neutralization with a neutralizing agent is determined as the ratio of the basic compound used for the total equivalent of carboxyl group.

In the porous polyimide film according to the second exemplary embodiment, the molar ratio (structural unit derived from tetracarboxylic dianhydride/structural unit derived from diamine) of the structural unit derived from tetracarboxylic dianhydride to the structural unit derived from diamine, both constituting a polyimide resin of the porous polyimide film, is 1.00 or more and 1.15 or less.

From the viewpoint of improving the strength and wettability of the porous polyimide film, the molar ratio (also referred to as the "α value" hereinafter) of the porous polyimide film is preferably 1.04 or more and 1.15 or less and more preferably 1.06 or more and 1.15 or less.

From the viewpoint of improving strength, the acid group in the porous polyimide film according to the exemplary embodiment of the present disclosure is more preferably introduced into an end than into a side chain of porous polyimide constituting the porous polyimide film.

For example, an acid group can be introduced into an end of a polyimide precursor by, for example, adjusting the mixing ratio of a monomer containing an acid group, which forms the porous polyimide film, so as to satisfy the acid value or the molar ratio (α value). Also, an acid group at an end of a polyimide chain is easily exposed in a surface when a film is formed, and is thus useful from the viewpoint of improving wettability.

(Characteristics of Porous Polyimide Film)

—Moisture Absorption Ratio—

The moisture absorption ratio of the porous polyimide film according to the exemplary embodiment of the present disclosure is preferably 0.5% or less and more preferably 0.2% or less. The lower limit value of the moisture absorption ratio of the porous polyimide film may be 0.01% or more.

A method for measuring the moisture absorption ratio of the porous polyimide film according to the exemplary embodiment of the present disclosure is described in examples later.

—Tensile Strength—

The tensile strength of the porous polyimide film according to the exemplary embodiment of the present disclosure is preferably 10 N/mm² or more and 100 N/mm² or less. From the viewpoint of forming the porous polyimide film having high strength, the tensile strength is more preferably 15 N/mm² or more and still more preferably 20 N/mm² or more.

A method for measuring the tensile strength of the porous polyimide film according to the exemplary embodiment of the present disclosure is described in examples later.

—Average Thickness—

The average thickness of the porous polyimide film according to the exemplary embodiment of the present disclosure is not particularly limited and is selected according to use and may be, for example, 10 μm or more and 1000 μm or less. The average thickness may be 20 μm or more or 30 μm or more, and 500 μm or less or 400 μm or less.

A method for measuring the average thickness of the porous polyimide film according to the exemplary embodiment of the present disclosure is described in examples later.

—Air Permeation Speed—

In view of material permeability, the porous polyimide film according to the exemplary embodiment of the present disclosure preferably has an air permeation speed of 25 seconds or less, more preferably 20 seconds or less, and still more preferably 15 seconds or less. The lower limit value may be 5 seconds or more.

For example, when the porous polyimide film according to the exemplary embodiment of the present disclosure is used as a separator for a battery, with the air permeation speed within the range described above, a decrease in cycle characteristics is suppressed. The lower air permeation speed causes excellent cycle characteristics, and thus the air permeation speed is more preferably a value closer to 0.

A method for measuring the air permeation speed of the porous polyimide film according to the exemplary embodiment of the present disclosure is described in examples later.

—Porosity—

From the viewpoint of maintaining sufficient film strength, the porosity of the porous polyimide film according to the exemplary embodiment of the present disclosure is preferably 50% or more and 80% or less. The lower limit of the porosity is more preferably 55% or more and still more preferably 60% or more. The upper limit of the porosity is more preferably 75% or less and still more preferably 70% or less.

For example, when the porous polyimide film according to the exemplary embodiment of the present disclosure is applied as a separator for a battery, the porosity is preferably within the same range as described above from the viewpoint of excellent cycle characteristics.

The porosity of the porous polyimide film according to the exemplary embodiment of the present disclosure is a value determined from the apparent density and true density of the porous polyimide film. The apparent density is a value obtained by dividing the mass (g) of the porous polyimide film by the total volume (cm³) of the porous polyimide film containing pores. The true density p is a value obtained by dividing the mass (g) of the porous polyimide film by the volume (cm³) of the porous polyimide film excluding pores. The porosity of the porous polyimide film is calculated by the following formula.

$$\text{Porosity}(\%) = \{1-(d/\rho)\} \times 100 = [1-\{(w/t)/\rho\}] \times 100 \quad \text{(Formula)}$$

d: apparent density of porous polyimide film (g/cm³)
ρ: true density of porous polyimide film (g/cm³)
w: weight per unit area of porous polyimide film (g/m²)
t: thickness of porous polyimide film (μm)

<Method for Producing Porous Polyimide Film>

Specifically, the polyimide contained in the porous polyimide film is produced by polymerizing the tetracarboxylic dianhydride with the diamine compound to produce a polyimide precursor and then imidizing a solution of the polyimide precursor. More specifically, the polyimide is produced by imidization reaction of a polyimide precursor solution in which the polyimide precursor and the organic amine compound are dissolved in an aqueous solvent containing water. An example of the method includes polymerizing the tetracarboxylic dianhydride with the diamine compound in the presence of the organic amine compound in the aqueous solvent to produce a resin (polyimide precursor), preparing the polyimide precursor solution.

Although described is an example including polymerizing the tetracarboxylic dianhydride with the diamine compound in the presence of the organic amine compound to produce a resin (polyimide precursor), preparing the polyimide precursor solution, the method is not limited to this example. For example, a method using a polyimide precursor solution in which the organic amine compound is not dissolved may be used. Specifically, a method for preparing a polyimide precursor solution includes polymerizing the tetracarboxylic dianhydride with the diamine compound in an aqueous mixed solvent selected from a water-soluble ether solvent, a water-soluble ketone solvent, a water-soluble alcohol solvent, and water (for example, combination of a mixed solvent of a water-soluble ether solvent and water, a water-soluble ketone solvent and water, or the like with a water-soluble alcohol solvent), thereby producing the polyimide precursor.

An example of the method for producing the porous polyimide film according to the exemplary embodiment of the present disclosure is described below.

The method for producing the porous polyimide film according to the exemplary embodiment of the present disclosure includes a first process, a second process, and a third process described below.

In the description below, the same constituent parts shown in FIG. 1 referred to are denoted by the same reference numeral. In FIG. 1, reference numeral 31 denotes a substrate, reference numeral 51 denotes a release layer, reference numeral 10A denotes a pore, and reference numeral 10 denotes a porous polyimide film.

The first process includes applying a polyimide precursor solution (also referred to as a "resin particle-dispersed polyimide precursor solution" hereinafter) containing the aqueous solvent, the resin particles, the organic amine compound, and the polyimide precursor to form a coating film, and then drying the coating film to form a film containing the polyimide precursor and the resin particles.

The second process includes imidizing the polyimide precursor by heating the film to form a polyimide film, the second process including treatment of removing the resin particles.

In the treatment of removing the resin particle, when the resin particles are removed with an organic solvent which dissolves the resin particles, even the resin having low removability due to crosslinkage can be removed by heating.

The third process includes acid-treating the porous polyimide film produced in the second process.

Specifically, the specific metal group is removed from the porous polyimide film, formed in the second process, by using an acid such as hydrochloric acid, nitric acid, sulfuric acid, phosphoric acid, acetic acid, methanesulfonic acid, para-toluenesulfonic acid, or the like.

The third process can decrease the moisture absorption ratio of the resultant porous polyimide film to an intended value.

(First Process)

In the first process, first, the polyimide precursor solution (also referred to as the "resin particle-dispersed polyimide precursor solution" hereinafter) containing the aqueous solvent, the resin particles, the organic amine compound, and the polyimide precursor is prepared.

The polyimide precursor solution is prepared by first preparing the resin particles and a polyimide precursor solution in which the polyimide precursor is dissolved in the aqueous solvent. The polyimide precursor solution in which the polyimide precursor is dissolved is a polyimide precursor solution in which the polyimide precursor and the organic amine compound are dissolved.

Then, the polyimide precursor solution in which the polyimide precursor and the organic amine compound are dissolved is mixed with the resin particles, preparing the resin particle-dispersed polyimide precursor solution.

Next, the resin particle-dispersed polyimide precursor solution is applied on a substrate to form a coating film. The coating film contains the polyimide precursor solution and the resin particles. The resin particles in the coating film are distributed in a state where aggregation is suppressed. Then, the coating film formed on the substrate is dried to form a film containing the polyimide precursor and the resin particles.

The substrate on which the film containing the polyimide precursor and the resin particles is formed is not particularly limited. Examples thereof include resin-made substrates of polystyrene, polyethylene terephthalate, and the like; glass substrates; ceramic substrates; metal substrates of iron, stainless steel (SUS), and the like; composite material substrates of combination of these materials; and the like. If required, a release layer may be provided on the substrate by, for example, release treatment with a silicone-based or fluorine-based release agent or the like. Also, it is effective to roughen the surface of the substrate to about the size of particle diameter of the resin particles and promote the exposure of the resin particles in the contact surface of the substrate.

A method for applying the resin particle-dispersed polyimide precursor solution on the substrate is not particularly limited. Examples thereof include various methods such as a spray coating method, a spin coating method, a roll coating method, a bar coating method, a slit die coating method, an ink jet coating method, and the like.

When the resin particle-dispersed polyimide precursor solution is applied on the substrate to form a coating film, the resin particles are added in such an amount that the resin particles are exposed from the surface of the coating film.

After the coating film containing the polyimide precursor solution prepared as described above and the resin particles is formed, the coating film is dried to form a film containing the polyimide precursor and the resin particles. Specifically, the coating film containing the polyimide precursor solution and the resin particles is dried by, for example, a method of heat-drying, natural drying, vacuum drying, or the like to form the film. More specifically, the film is formed by drying the coating film so that the solvent remaining in the film is 50% or less, preferably 30% or less, relative to the solid content of the film. The film is in a state where the polyimide precursor can be dissolved in water.

Also, in the process of drying the resultant coating film to form a film, the resin particles may be exposed by the treatment of exposing the resin particles. The treatment of exposing the resin particles can increase the opening ratio of the porous polyimide film.

A specific example of the treatment of exposing the resin particles is the following method.

In the process of forming, after forming the coating film containing the polyimide precursor solution and the resin particles, a film containing the polyimide precursor and the resin particles by drying the coating film, as described above, the film is in a state where the polyimide precursor can be dissolved in water. In this state, the resin particles in the film can be exposed by, for example, the treatment of wiping, immersion in water, or the like. Specifically, the polyimide precursor solution present above the resin particle layer is removed by the treatment of exposing the resin particle layer by wiping with water. Thus, the resin particles present in an upper region (that is, a region of the resin particle layer on the side apart from the substrate) are exposed from the surface of the film.

Even when the film containing the resin particles embedded therein is formed on the substrate by using the resin particle-dispersed polyimide precursor solution, the same treatment as the treatment of exposing the resin particles described above can be used as the treatment of exposing the resin particles embedded in the film.

The method for preparing the resin particle-dispersed polyimide precursor solution is not limited to the preparation method described above. From the viewpoint of simplifying the process, the polyimide precursor is also preferably synthesized in an aqueous solvent dispersion in which the resin particles not dissolved in the polyimide precursor solution have been dispersed in an aqueous solvent. A specific example of the method is the following.

The resin particles are formed in an aqueous solvent containing water to prepare a resin particle dispersion. Then, a resin (polyimide precursor) is produced by polymerizing the tetracarboxylic dianhydride with the diamine compound in the presence of the organic amine in the resin particle dispersion.

Further examples of the method for preparing the resin particle-dispersed polyimide precursor solution include a method of mixing the polyimide precursor solution with the resin particles in a dry state, a method of mixing the polyimide precursor solution with a dispersion in which the resin particles have been dispersed in an aqueous solvent, and the like.

The dispersion in which the resin particles have been dispersed in an aqueous solvent may be a resin particle dispersion prepared by previously dispersing the resin particles in an aqueous solvent or may be a commercial product of a dispersion in which the resin particles are previously dispersed in an aqueous solvent. When a commercial product of the dispersion is used, the dispersion is preferably such that the total content of the specific metal group contained in the porous polyimide film is preferably 100 ppm or less relative to the porous polyimide film. When the dispersion containing the resin particles previously dispersed therein is prepared, the dispersibility of the resin particles may be increased by previously adding a surfactant not containing a metal in the specific metal group.

Then, the resin particle-dispersed polyimide precursor solution prepared as described above is applied on the substrate to form a coating film by the method described above. Then, the coating film is dried to form a film on the substrate.

(Second Process)

In the second process, the polyimide precursor is imidized by heating the film formed in the first process and containing the polyimide precursor and the resin particles to form a polyimide film. The second process includes treatment of removing the resin particles. The porous polyimide film is formed through the treatment of removing the resin particles.

In the second process, in forming the polyimide film, specifically, imidization is allowed to proceed by heating the film formed in the first process and containing the polyimide precursor and the resin particles, and the polyimide film is formed by further heating. As imidization proceeds to increase the imidization ratio, dissolution in an organic solvent becomes difficult.

In the second process, the treatment of removing the resin particles is performed. The resin particles may be removed in the process of imidizing the polyimide precursor by heating the film or removed from the polyimide film after (after imidization) the completion of imidization.

In the exemplary embodiment of the present disclosure, the process of imidizing the polyimide precursor represents the process of allowing imidization to proceed by heating the film, which is formed in the first process and contains the polyimide precursor and the resin particles, to create a state before the polyimide film is formed after the completion of imidization.

Specifically, the resin particles may be removed from the film (the film in this stage may be referred to as the "polyimide film" hereinafter) in the process of imidizing the polyimide precursor by heating the coating film which is formed in the first process and in which the resin particles are exposed. Alternatively, the resin particles may be removed from the polyimide film after the completion of imidization. Consequently, the porous polyimide film is produced, from which the resin particles have been removed (refer to FIG. 1).

In the process of removing the resin particles, the resin component of the resin particles may be contained as a resin other than the polyimide resin. Although not shown in the drawings, the porous polyimide film may contain a resin other than the polyimide resin.

In view of resin particle removability or the like, the treatment of removing the resin particles is preferably performed when the imidization ratio of the polyimide precursor in the polyimide film is 10% or more during the process of imidizing the polyimide precursor. With the imidization ratio of 10% or more, a state insoluble in an organic solvent is easily created, and thus the form is easily maintained.

The treatment of removing the resin particles is not particularly limited as long as the porous polyimide film can be formed. Examples thereof include a method of removing the resin particles by heating decomposition, a method of removing with an organic solvent which dissolves the resin particles, a method of removing by decomposition of the resin particles with a laser or the like, and the like.

The resin particles may be removed by, for example, only heating for both decomposition and imidization, or may be removed by combination of heating for decomposition and dissolution of the resin particles in an organic solvent. In view of more relaxing the residual stress and suppressing the occurrence of crack in the porous polyimide film, a preferred method includes the treatment of removing with an organic solvent which dissolves the resin particles. This function in the treatment of removing with the organic solvent is supposed to be due to the easy transfer of the resin component dissolved in the organic solvent into the polyimide resin.

For example, the method of removing by heating may cause a decomposed gas by heating depending on the type of the resin particles. Thus, breakage, cracking, or the like may occur in the porous polyimide film due to the decomposed gas. Therefore, in view of suppressing the occurrence of cracking, it is preferred to use the method of removing with an organic solvent which dissolves the resin particles.

In addition, it is also effective to increase the removal ratio by further heating after the removal with the organic solvent which dissolves the resin particles.

Also, when the resin particles are removed by the method of removing with an organic solvent which dissolves the resin particles, the resin component of the resin particles dissolved in the organic solvent may enter the polyimide film during the process of removing the resin particles. Thus, by using this method, a resin other than the polyimide resin can be positively contained in the resultant polyimide film. In view of containing a resin other than the polyimide resin, it is more preferred to use the method of removing with an organic solvent which dissolves the resin particles. Further, in view of containing a resin other than the polyimide resin, this method of removing the resin particles is preferably performed for the film (polyimide film) during imidization of the polyimide precursor. When in the state of the polyimide film, the resin particles are dissolved in a solvent which dissolves the resin particles, the resin component may more easily enter the polyimide film.

The method of removing with an organic solvent which dissolves the resin particles is, for example, a method of dissolving and removing the resin particles by contact (for example, immersion in the solvent or contact with solvent vapor) with the organic solvent which dissolves the resin particles. In this case, immersion in the solvent is desirable in view of increasing the dissolution efficiency of the resin particles.

The organic solvent which dissolves the resin particles and is used for removing the resin particles is not particularly limited as long as the organic solvent can dissolve the resin particles but does not dissolve the polyimide film before the completion of imidization and the polyimide film after the completion of imidization. Examples thereof include ethers such as tetrahydrofuran, 1,4-dioxane, and the like; aromatics such as benzene, toluene, and the like; ketones such as acetone and the like; esters such as ethyl acetate and the like; and the like.

Among these, ethers such as tetrahydrofuran, 1,4-dioxane, and the like, and aromatics such as benzene, toluene, and the like are preferred, and tetrahydrofuran and toluene are more preferably used.

When the aqueous solvent remains at the time of dissolving the resin particles, the aqueous solvent is dissolved in the solvent which dissolves the uncrosslinked resin particles, and the polyimide precursor is precipitated, creating a state similar to a so-called wet phase transition method. This may cause difficulty in controlling the pore diameter, and thus the uncrosslinked resin particles are preferably removed by dissolution in the organic solvent after the amount of the aqueous solvent remaining is decreased to 20% by mass or less, preferably 10% by mass or less relative to the mass of the polyimide precursor.

In the second process, a heating method for allowing imidization to proceed by heating the film, formed in the first process, to form the polyimide film is not particularly limited. For example, a method of heating in two stages can be used. In the case of two-stage heating, specific heating conditions are as follows.

A desired heating condition of the first stage is a temperature at which the shape of the resin particles can be maintained. Specifically, the temperature is, for example, within a range of 50° C. or more and 150° C. or less and preferably within a range of 60° C. or more and 140° C. or less. In addition, a heating time is preferably within a range of 10 minutes or more and 60 minutes or less. The higher the heating temperature, the shorter the heating time.

Heating conditions of the second stage are, for example, heating conditions of 150° C. or more and 450° C. or less (preferably 200° C. or more and 400° C. or less) and 20 minutes or more and 120 minutes or less. Under these heating conditions within the respective ranges, imidization reaction further proceeds, and the polyimide film can be formed. In the heating reaction, heating may be performed by increasing the temperature stepwise or gradually at a constant rate before the temperature reaches the final heating temperature.

The heating conditions are not limited to the conditions of the two-stage heating method, and a method of heating in one stage may be used. In the case of the one-stage heating method, for example, imidization may be completed under only the heating conditions of the second stage described above.

When the treatment of exposing the resin particles is not performed in the first process, in view of increasing an opening ratio, the resin particles may be exposed by treatment of exposing the resin particles in the second process. The treatment of exposing the resin particles in the second process is preferably performed during the process of imidizing the polyimide precursor or after imidization and before the treatment of removing the resin particles.

The treatment of exposing the resin particles is performed, for example, when the polyimide film has the following state.

In the case of treatment of exposing the resin particles when the imidization ratio of the polyimide precursor in the polyimide film is less than 10% (that is, in the state where the polyimide film can be dissolved in water), examples of the treatment of exposing the resin particles embedded in the polyimide film include a treatment of wiping, a treatment of immersion in water, and the like.

In the treatment of exposing the resin particles when the imidization ratio of the polyimide precursor in the polyimide film is 10% or more (that is, in a state insoluble in the organic solvent) and when the polyimide film is formed after the completion of imidization, examples of a usable method include a method of exposing the resin particles by mechanically cutting with a tool such as sandpaper, a method of etching with an alkali solution which dissolves the polyimide resin, and a method of exposing the resin particles by decomposition with a laser or the like.

For example, in the case of mechanical cutting, the resin particles present in an upper region (that is, a region of the resin particle layer on the side apart from the substrate) of the resin particle layer embedded in the polyimide film are partially cut together with the polyimide film present in the upper portions of the resin particles, and the cut resin particles are exposed from the surface of the polyimide film.

Then, the resin particles are removed, by the resin particle removing treatment described above, from the polyimide film in which the resin particles are exposed. Thus, the porous polyimide film, from which the resin particles have been removed, can be formed.

In this case, when the film is formed on the substrate by using the resin particle-dispersed polyimide precursor solution, the resin particle-dispersed polyimide precursor solution is applied on the substrate to form a coating film in which the resin particles are embedded. When a film containing the polyimide precursor and the resin particles is formed by drying the coating film without the treatment of exposing the resin particles, the film in which the resin particles are embedded may be formed. For example, by heating the film in which the resin particles are embedded, the film (polyimide film) in the imidization process has a state where a resin particle layer is embedded. The treatment of exposing the resin particles in order to increase the opening ratio in the second process may be the same treatment as for exposing the resin particles described above. Thus, upper regions are cut together with the polyimide film present in the upper portions of the resin particles, and the resin particles are exposed from the surface of the polyimide film.

Then, the resin particles are removed, by the resin particle removing treatment described above, from the polyimide film in which the resin particles have been exposed. Thus, the porous polyimide, film from which the resin particles have been removed, can be formed.

In the second process, the substrate used for forming the film in the first process may be separated when the dry film is formed, may be separated when the polyimide precursor in the polyimide film is in a state insoluble in the organic solvent, or may be separated when the film is formed after the completion of imidization.

(Third Process)

The third process is a process of acid-treating the porous polyimide film formed in the second process.

Specifically, the process includes acid treatment using an acid such as hydrochloric acid, nitric acid, sulfuric acid, phosphoric acid, acetic acid, methanesulfonic acid, para-toluenesulfonic acid, or the like.

The conditions for acid treatment are preferably the conditions including a temperature of 5° C. to 70° C. (more preferably 10° C. to 50° C.) and a time of 10 seconds to 60 minutes (more preferably 30 seconds to 30 minutes). The moisture absorption ratio of the porous polyimide film can be controlled to 0.5% or less by the acid treatment.

In addition, the porous polyimide film after acid treatment may be washed with water, alcohol, water-soluble ether, or the like. The washing conditions are preferably the conditions including a temperature 5° C. to 70° C. (more preferably 10° C. to 50° C.) and a time of 10 seconds to 60 minutes (more preferably 30 seconds to 30 minutes). The washing can decrease the total content of the specific metal group contained in the polyimide film.

The porous polyimide film containing the polyimide resin and the resin other than the polyimide resin is produced through the processes described above. The porous polyimide film may be post-processed according to purpose of use.

Herein, the imidization ratio of the polyimide precursor is described.

Examples of a partially imidized polyimide precursor include precursors having structures each having a repeating unit represented by any one of a general formula (I-1), general formula (I-2), and general formula (I-3) below.

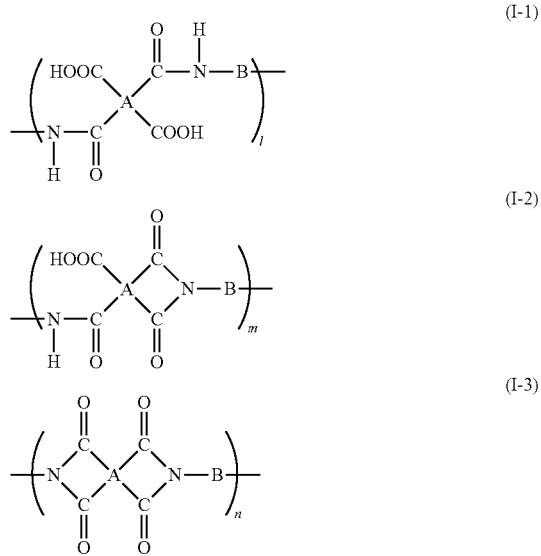

In the general formula (I-1), the general formula (I-2), and the general formula (I-3), A represents a tetravalent organic group, B represents a divalent organic group, l represents an integer of 1 or more, and m and n each independently represent 0 or an integer of 1 or more.

In addition, A and B represent the same meanings as A and B, respectively, in a general formula (I) described later.

The imidization ratio of the polyimide precursor represents the ratio of the number (2n+m) of imide ring-closed bond parts to the total number of bond parts (2l+2m+2n) in bond parts (reaction parts between tetracarboxylic dianhydride and diamine compound) of the polyimide precursor. That is, the imidization ratio of the polyimide precursor is represented by "(2n+m)/(2l+2m+2n)".

The imidization ratio of the polyimide precursor (value of "(2n+m)/(2l+2m+2n)") is measured by the following method.

—Measurement of Imidization Ratio of Polyimide Precursor—

Formation of Polyimide Precursor Sample (i) A polyimide precursor solution to be measured is applied in a thickness within a range of 1 μm or more and 10 μm or less on a silicon wafer to form a coating film sample.

(ii) The solvent in the coating film sample is substituted by tetrahydrofuran (THF) by immersing the coating film sample in tetrahydrofuran (THF) for 20 minutes. The solvent for immersion is not limited to THF and can be selected from solvents which do not dissolve the polyimide precursor but are miscible with the solvent component contained in the polyimide precursor solution. Usable examples thereof include alcohol solvents such as methanol, ethanol, and the like, and ether compounds such as dioxane and the like.

(iii) The coating film sample is taken out from THF, and THF adhering to the surface of the coating film sample is removed by spraying $N_2$ gas. Then, the coating film sample is dried by treatment for 12 hours or more under a reduced pressure of 10 mmHg or less within a range of 5° C. or more and 25° C. or less, forming a polyimide precursor sample.

Formation of 100% Imidized Standard Sample (iv) Similarly to the above (i), the polyimide precursor solution to be measured is applied on a silicon wafer to form a coating film sample.

(v) Imidization reaction is performed by heating the coating film sample at 380° C. for 60 minutes to form a 100% imidized standard sample.

Measurement and Analysis (vi) An infrared absorption spectrum of each of the 100% imidized standard sample and the polyimide precursor sample is measured by using a Fourier transform infrared spectrophotometer (manufactured by Horiba Ltd. FT-730). In the 100% imidized standard sample, the ratio I'(100) of the absorption peak (Ab'(1780 $cm^{-1}$)) due to an imide bond near 1780 $cm^{-1}$ to the absorption peak (Ab'(1500 $cm^{-1}$) due to an aromatic ring near 1500 $cm^{-1}$ is determined.

(vii) Similarly, in measurement of the polyimide precursor sample, the ratio I(x) of the absorption peak (Ab (1780 $cm^{-1}$)) due to an imide bond near 1780 $cm^{-1}$ to the absorption peak (Ab (1500 $cm^{-1}$) due to an aromatic ring near 1500 $cm^{-1}$ is determined.

By using the measured absorption peaks I'(100) and I(x), the imidization ratio of the polyimide precursor is calculated based on the following formulae.

Imidization ratio of polyimide precursor=$I(x)/I'(100)$  Formula $I'(100)=(Ab'(1780\ cm^{-1}))/(Ab'(1500\ cm^{-1}))$  Formula $I(x)=(Ab(1780\ cm^{-1}))/(Ab(1500\ cm^{-1}))$  Formula The measurement of the imidization ratio of the polyimide precursor is applied to measurement of the imidization ratio of an aromatic polyimide precursor. In measurement of the imidization ratio of an aliphatic polyimide precursor, a peak due to a structure not changed before and after imidization reaction is used as an internal standard peak in place of the aromatic ring absorption peak.

Next, each of the components in the polyimide precursor for producing the porous polyimide film according to the exemplary embodiment of the present disclosure is described.

(Polyimide Precursor Solution)

The polyimide precursor solution contains the aqueous solvent, the resin particles, the organic amine compound, and the polyimide precursor.

(Polyimide Precursor)

The polyimide precursor is a resin (polyimide precursor) having a repeating unit represented by a general formula (I).

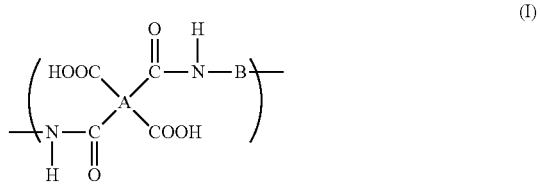

(In the formula (I), A represents a tetravalent organic group, and B represents a divalent organic group.)

In the general formula (I), a tetravalent organic group represented by A is a residue after removal of the four carboxyl groups from the tetracarboxylic dianhydride used as a raw material.

On the other hand, a divalent organic group represented by B is a residue after removal of two amino groups from the diamine compound used as a raw material.

That is, the polyimide precursor having a repeating unit represented by the general formula (I) is a polymer of the tetracarboxylic dianhydride and the diamine compound.

The tetracarboxylic dianhydride may be either an aromatic or aliphatic compound, but an aromatic compound is preferred. That is, in the general formula (I), the tetravalent organic group represented by A is preferably an aromatic organic group.

Examples of the aromatic tetracarboxylic dianhydride include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylether tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furantetracarboxylic dianhydride, 4,4'-bis(3,4-dicarboxyphenoxy)diphenyl sulfide dianhydride, 4 4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidene diphthalic dianhydride, 3,3',4,4'-biphenyltetracarboxylic dianhydride, 2,3,3',4'-biphenyltetracarboxylic dianhydride, bis(phthalic acid)phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenyl ether dianhydride, bis(triphenylphthalic acid)-4,4'-diphenylmethane dianhydride, and the like.

Examples of the aliphatic tetracarboxylic dianhydride include aliphatic or alicyclic tetracarboxylic dianhydrides such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 5-(2,5-dioxotetahydrofuryl)-3-methyl-3-cyclohexene-1,2-dicarboxylic dianhydride, bicyclo[2,2,2]-oct-7-ene-2,3,5,6-tetracarboxylic dianhydride, and the like; aliphatic tetracarboxylic dianhydrides each having an aromatic ring, such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, and the like; and the like.

Among these, an aromatic tetracarboxylic dianhydride is preferred as the tetracarboxylic dianhydride, and, specifically, for example, pyromellitic dianhydride, 3,3',4,4'-biphenyltetracarboxylic dianhydride, 2,3,3',4'-biphenyltetracarboxylic dianhydride, 3,3',4,4'-biphenylether tetracarboxylic dianhydride, and 3,3',4,4'-benzophenone tetracarboxylic dianhydride are preferred, pyromellitic dianhydride, 3,3',4,4'-biphenyltetracarboxylic dianhydride, and 3,3',4,4'-benzophenone tetracarboxylic dianhydride are more preferred, and 3,3',4,4'-biphenyltetracarboxylic dianhydride is particularly preferred.

These tetracarboxylic dianhydrides may be used alone or in combination of two or more.

In the use of combination of two or more types, aromatic tetracarboxylic dianhydrides or aliphatic tetracarboxylic dianhydrides may be used in combination, or an aromatic tetracarboxylic dianhydride and an aliphatic tetracarboxylic dianhydrides may be used in combination.

On the other hand, the diamine compound has two amino groups in its molecular structure. The diamine compound may be either an aromatic or aliphatic compound, but an aromatic compound is preferred. That is, in the general formula (I), the divalent organic group represented by B is preferably an aromatic organic group.

Examples of the diamine compound include aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenyl sulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)biphenyl, 1,3'-bis(4-aminophenoxy)benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-bis[4-(4-amino-2-trifluoromethyl)phenoxy]-octafluorobiphenyl, and the like; aromatic diamines such as diaminotetrafluorothiophene and the like, each having two amino groups bonded to an aromatic ring and a heteroatom other than the nitrogen atoms of the amino groups; aliphatic diamines and alicyclic diamines such as 1,1-meta-xylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylene diamine, hexahydro-4,7-metanoindanylene dimethylene diamine, tricyclo[6,2,1,0$^{2.7}$]-undecylene dimethyldiamine, 4,4'-methylene bis(cyclohexylamine), and the like; and the like.

Among these, the diamine compound is preferably an aromatic diamine compound, and specifically, for example, p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, and 4,4'-diaminodiphenyl sulfone are preferred, and 4,4'-diaminodiphenyl ether and p-phenylenediamine are particularly preferred.

These diamine compounds may be used alone or in combination of two or more. In the use of combination of two or more, aromatic diamine compounds or aliphatic diamine compounds may be used in combination, or an aromatic diamine compound and an aliphatic diamine compound may be used in combination.

The number average molecular weight of the polyimide precursor is preferably 1,000 or more and 150,000 or less, more preferably 5,000 or more and 130,000 or less, and still more preferably 10,000 or more and 100,000 or less.

With the polyimide precursor having a number average molecular weight within the range, a decrease in solubility of the polyimide precursor in a solvent is suppressed, thereby easily securing film formability.

The number average molecular weight of the polyimide precursor is measured by gel permeation chromatography (GPC) under measurement conditions described below.

Column: Tosoh TSK gel α-M (7.8 mm I.D×30 cm)
Eluent: DMF (dimethylformamide)/30 mM LiBr/60 mM phosphoric acid
Flow rate: 0.6 mL/min
Injection amount: 60 μL
Detector: RI (differential refractive index detector)

The content (concentration) of the polyimide precursor relative to the whole of the polyimide precursor solution is 0.1% by mass or more and 40% by mass or less, preferably 0.5% by mass or more and 25% by mass or less, and more preferably 1% by mass or more and 20% by mass or less.

(Organic Amine Compound)

The organic amine compound is a compound which increases the solubility of the polyimide precursor in the aqueous solvent by forming an amine salt of the polyimide precursor (carboxyl group thereof) and which functions as an imidization promoter. Specifically, the organic amine compound is preferably a compound having a molecular weight of 170 or less. The organic amine compound is preferably a compound except for the diamine compound used as the raw material of the polyimide precursor.

The organic amine compound is preferably a water-soluble compound. The term "water-soluble" represents that 1% by mass or more of an object material is dissolved in water at 25° C.

The organic amine compound is, for example, a primary amine compound, a secondary amine compound, or a tertiary amine compound.

Among these, the organic amine compound is preferably at least one (particularly, the tertiary amine compound) selected from the secondary amine compound and the tertiary amine compound. When the tertiary amine compound or secondary amine compound (particularly, the tertiary amine compound) is applied as the organic amine compound, it is possible to easily increase the solubility of the polyimide precursor in the solvent, easily improve film formability, and easily improve the storage stability of the polyimide precursor solution.

The organic amine compound is, for example, a divalent or higher polyvalent amine compound other than a monovalent amine compound. When a divalent or higher polyvalent amine compound is applied, a pseudo-crosslinked structure is easily formed between polyimide precursor molecules, and the storage stability of the polyimide precursor solution is easily improved.

Examples of the primary amine compound include methylamine, ethylamine, n-propylamine, isopropylamine, 2-ethanolamine, 2-amino-2-methyl-1-propanol, and the like.

Examples of the secondary amine compound include dimethylamine, 2-(methylamino) ethanol, 2-(ethylamino) ethanol, morpholine, and the like.

Examples of the tertiary amine compound include 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, N-ethylpiperidine, and the like.

From the viewpoint of the pot life of the polyimide precursor solution and film thickness uniformity, the tertiary amine compound is preferred. From this viewpoint, more preferred is at least one selected from the group consisting of 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine. In particular, N-alkylmorpholine is preferably used.

From the viewpoint of film formability, the organic amine compound is also preferably an amine compound (hereinafter, referred to as a "nitrogen-containing heterocyclic amine compound") having an aliphatic cyclic structure or aromatic cyclic structure having a heterocyclic structure containing nitrogen. The nitrogen-containing heterocyclic amine compound is more preferably a tertiary amine compound.

Examples of the nitrogen-containing heterocyclic amine compound include isoquinolines (compounds having an isoquinoline skeleton), pyridines (amine compounds having a pyridine skeleton), pyrimidines (amine compounds having a pyrimidine skeleton), pyrazines (amine compounds having a pyrazine skeleton), piperazines (amine compounds having a piperazine skeleton), triazines (amine compounds having a triazine skeleton), imidazoles (amine compounds having an imidazole skeleton), morpholines (amine compounds having a morpholine skeleton), polyaniline, polypyridine, polyamine, and the like.

From the viewpoint of film formability, the nitrogen-containing heterocyclic amine compound is preferably at least one selected from the group consisting of morpholines, pyridines, piperidines, and imidazoles, and more preferably morpholines (amine compounds having a morpholine skeleton). Among these, more preferred is at least one selected from the group consisting of N-methylmorpholine, N-methylpiperidine, pyridine, 1,2-dimethylimidazole, 2-ethyl-4-methylimidazole, and picoline, and still more preferred is N-methylmorpholine.

Among these, the organic amine compound is preferably a compound having a boiling point of 60° C. or more (preferably 60° C. or more and 200° C. or less and more preferably 70° C. or more and 150° C. or less). With the organic amine compound having a boiling point of 60° C. or more, evaporation of the organic amine compound from the polyimide precursor solution is suppressed, and a decrease in solubility of the polyimide precursor in the solvent is easily suppressed.

The content of the organic amine compound is preferably 50 mole % or more and 500 mol % or less, more preferably 80 mol % or more and 250 mol % or less, and still more preferably 90 mol % or more and 200 mol % or less relative to carboxyl groups (—COOH) of the polyimide precursor in the polyimide precursor solution.

When the content of the organic amine compound is within the range, it is possible to easily increase the solubility of the polyimide precursor in the solvent, easily improve film formability, and easily improve the storage stability of the polyimide precursor solution.

These organic amine compounds may be used alone or in combination of two or more.

[Aqueous Solvent Containing Water]

The aqueous solvent containing water is specifically a solvent containing 50% by mass or more of water relative to the total aqueous solvent. Examples of water include distilled water, ion-exchange water, ultrafiltered water, pure water, and the like.

The content of water is preferably 50% by mass or more and 100% by mass or less, more preferably 70% by mass or more and 100% by mass or less, and sill more preferably 80% by mass or more and 100% by mass or less relative to the total aqueous solvent.

When the aqueous solvent contains a solvent other than water, the solvent other than water is, for example, a water-soluble organic solvent. From the viewpoint of transparency, mechanical strength, and the like of the polyimide formed product, a water-soluble organic solvent is preferred as the solvent other than water. The "water-soluble" represents that 1% by mass or more of an object substance is dissolved in water at 25° C.

The water-soluble organic solvents may be used alone or in combination of two or more.

A water-soluble ether solvent is a solvent having an ether bond in one molecule thereof. Examples of the water-soluble ether solvent include tetrahydrofuran (THF), dioxane, trioxane, 1,2-dimethoxyethane, diethylene glycol dimethyl ether, diethylene glycol diethyl ether, and the like. Among these, tetrahydrofuran and dioxane are preferred as the water-soluble ether solvent.

A water-soluble ketone solvent is a water-soluble solvent having a ketone group in one molecule. Examples of the water-soluble ketone solvent include acetone, methyl ethyl ketone, cyclohexanone, and the like. Among these, acetone is preferred as the water-soluble ketone solvent.

A water-soluble alcohol solvent is a water-soluble solvent having an alcoholic hydroxyl group in one molecule. Examples of the water-soluble alcohol solvent include methanol, ethanol, 1-propanol, 2-propanol, tert-butyl alcohol, ethylene glycol, ethylene glycol monoalkyl ethers, propylene glycol, propylene glycol monoalkyl ethers, diethylene glycol, diethylene glycol monoalkyl ethers, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, 1,2,6-hexanetriol and the like. Among these, methanol, ethanol, 2-propanol, ethylene glycol, ethylene glycol monoalkyl ethers, propylene glycol, propylene glycol monoalkyl ethers, diethylene glycol, and diethylene glycol monoalkyl ethers are preferred as the water-soluble alcohol solvent.

Examples of an aprotic polar solvent include N-methyl-2-pyrrolidone (NMP), N,N-dimethylformamide (DMF), N,N-dimethylacetamide (DMAc), N,N-diethylacetamide (DEAc), dimethyl sulfoxide (DMSO), hexamethylene phosphoramide (HMPA), N-methylcaprolactam, N-acetyl-2-pyrrolidone, N,N-dimethyl imidazolidinone (DMI), 1,3-dimethyl-imidazolidone, and the like.

When a solvent other than water is contained as the aqueous solvent, the solvent used in combination has a boiling point of 270° C. or less, preferably 60° C. or more and 250° C. or less, and more preferably 80° C. or more and 230° C. or less. When the solvent used in combination has a boiling point within the range, the solvent other than water hardly remains in the polyimide film, and the polyimide film having high mechanical strength can be easily produced.

The range where the polyimide precursor is dissolved in the solvent is controlled according to the water content and the type and amount of the organic amine compound. Within the range of low water contents, the polyimide precursor is easily dissolved within the range where the content of the organic amine compound is low. Conversely, within the range of high water contents, the polyimide precursor is easily dissolved within a range where the content of the organic amine compound is high. Also, when the organic amine compound has a hydroxyl group and high hydrophilicity, the polyimide precursor is easily dissolved within the range of high water contents.

Also, the polyimide precursor synthesized by using an organic solvent such as an aprotic polar solvent or the like (for example, N-methyl pyrrolidone (NMP) or the like) is added and precipitated in a poor solvent such as water, alcohol, or the like, and the resultant precipitate may be separated and used as the polyimide precursor.

(Resin Particle)

The resin particles are not dissolved in the aqueous solvent containing water. Also, the resin particles are not dissolved in the polyimide precursor solution.

The resin particles are not particularly limited, but are composed of a resin other than polyimide. Examples thereof include resin particles produced by polycondensation of a polymerizable monomer, such as polyester resins, urethane resins, and the like; and resin particles produced by radical polymerization of a polymerizable monomer, such as vinyl resins, olefin resins, and the like. Examples of the resin particles produced by radical polymerization include those of (meth)acrylic resins, (meth)acrylate ester resins, styrene-(meth)acrylic resins, polystyrene resins, polyethylene resins, and the like.

From the viewpoint of removal of the resin particles in the second process described above, the resin particles are preferably soluble in a solvent which does not dissolve the polyimide resin.

Among these, from the viewpoint of control of the particle shape and removability, a resin using a radical polymerizable monomer is preferred for the resin particles, and the resin particles are preferably composed of at least one resin selected from the group consisting of (meth)acrylic resins, (meth)acrylate ester resins, styrene-(meth)acrylic resins, and polystyrene resins.

In the specification of the present disclosure, the expression "not dissolved" includes undissolution of an object material in an object liquid at 25° C. and dissolution of an object material within a range of 3% by mass or less in an object liquid at 25° C.

For example, the expression "not dissolved in the aqueous solvent containing water" represents that the object resin particles are resin particles which are substantially not dissolved in the aqueous solvent containing water at 25° C. and includes undissolution of the resin particles in the aqueous solvent containing water and dissolution of the resin particles within a range of 3% by mass or less. Also, the expression "not dissolved in the polyimide precursor solution" represents that the object resin particles are resin particles which are substantially not dissolved in the polyimide precursor solution at 25° C. and includes undissolution of the resin particles in the polyimide precursor solution and dissolution of the resin particles within a range of 3% by mass or less.

In addition, the expression "soluble in the organic solvent" represents that, on a mass basis, 10% or more of the object resin particles are dissolved in the object organic solvent at 25° C.

In the exemplary embodiment of the present disclosure, the meaning of "(meth)acrylic" includes both "acrylic" and "methacrylic".

In view of controlling, within the ranges described above, the total content of the specific metal group contained in the porous polyimide film relative to the porous polyimide film and the total content of the specific metal group contained in the polyimide precursor solution relative to the polyimide precursor solution, the total content of the specific metal group contained in the resin particles is preferably decreased to, for example, 200 ppm or less (preferably 150 ppm or less). The total content of the specific metal group contained in the resin particles is preferably as low as possible, and the lower limit value is not particularly limited but is preferably 0 ppm. The content of "0 ppm" represents a detection limit or less. The total content of the specific metal group contained in the resin particles is measured by atomic absorption spectrometry.

A method for adjusting the total content of the specific metal group contained in the resin particles is not particularly limited. For example, when the resin particles are vinyl resin particles, a synthesis method therefor is not particularly limited, and a known polymerization method (a radical polymerization method such as emulsion polymerization, soap-free emulsion polymerization, suspension polymerization, mini-emulsion polymerization, micro-emulsion polymerization, or the like) can be used.

In particular, for example, in view of controlling the total content of the specific metal group contained in the resin particles within the range described above, the resin particles are preferably produced by a method of emulsion polymerization using a surfactant not containing the specific metal group, a method of soap-free polymerization without using a surfactant, or a method of washing the resin particles produced by the emulsion polymerization method.

That is, the resin particles are preferably at least one of the emulsion-polymerized resin particles using a surfactant not containing the specific metal group, the soap-free emulsion-polymerized resin particles, and the washed resin particles. These types of resin particles may be used alone or in combination of two or more.

In the specification of the present disclosure, the "washed resin particles" represents the resin particles washed to adjust the total content of the specific metal group contained in the resin particles within the range described above.

For example, when the emulsion polymerization method is applied to production of the vinyl resin particles, a monomer such as styrene, (meth)acrylic acid, or the like is added to water in which a water-soluble polymerization initiator such as potassium persulfate, ammonium persulfate, or the like has been dissolved. Then, polymerization (soap-free emulsion polymerization) is performed without using a surfactant, producing the vinyl resin particles containing the specific metal group at a total content within the range described above.

Also, a monomer such as styrene, (meth)acrylic acid, or the like is added to water in which a water-soluble polymerization initiator such as potassium persulfate, ammonium persulfate, or the like has been dissolved, and further, if required, a surfactant not containing the specific metal group is added. Then, polymerization is performed by heating under stirring to produce the vinyl resin particles containing the specific metal group at a total content within the range described above.

In addition, the resultant vinyl resin particles are washed to produce the vinyl resin particles containing the specific metal group at a total content within the range described above. In particular, when a surfactant (for example, an anionic surfactant such as sodium lauryl sulfate, sodium dodecyl sulfate, or the like) containing the specific metal group is used as the surfactant, the resultant vinyl resin particles are washed to produce the vinyl resin particles containing the specific metal group at a total content within the range described above.

When the surfactant is used for producing the vinyl resin particles by the emulsion polymerization method, the surfactant is not particularly limited, but the surfactant not containing a metal in the specific metal group is preferably used in view of the ability to omit the washing of the resultant resin particles.

Examples of the surfactant not containing a metal in the specific metal group include ammonium salt anionic surfactants of a sulfonate salt type and the like, nonionic surfactants of an ether type, an ester type, an ester-ether type, and the like, cationic surfactants of a quaternary ammonium salt type and the like, and amphoteric surfactants of a betaine type and the like.

Examples of monomers of the vinyl resin include vinyl resin units produced by polymerizing monomers, such as styrene, alkyl-substituted styrene (for example, α-methylstyrene, 2-methylstyrene, 3-methylstyrene, 4-methylstyrene, 2-ethylstyrene, 3-ethylstyrene, 4-ethylstyrene, and the like), halogen-substituted styrene (for example, 2-chlorostyrene, 3-chlorostyrene, 4-chlorostyrene, and the like); styrenes each having a styrene skeleton, such as vinylnaphthalene and the like; (meth)acrylic acid esters having a vinyl group, such as methyl (meth)acrylate, ethyl (meth)acrylate, n-propyl (meth)acrylate, n-butyl (meth)acrylate, lauryl (meth)acrylate, 2-ethylhexyl (meth)acrylate, and the like; vinylnitriles such as acrylonitrile, methacrylonitrile, and the like; vinyl ethers such as vinyl methyl ether, vinyl isobutyl ether, and the like; vinyl ketones such as vinyl methyl ketone, vinyl ethyl ketone, vinyl isopropenyl ketone, and the like; acids such as (meth)acrylic acid, maleic acid, cinnamic acid, fumaric acid, vinylsulfonic acid, and the like; bases such as ethyleneimine, vinylpyridine, vinylamine, and the like; and the like.

A monofunctional monomer such as vinyl acetate or the like, a difunctional monomer such as ethylene glycol dimethacrylate, nonane diacrylate, decanediol diacrylate, or the like, or a polyfunctional monomer such as trimethylolpropane triacrylate, trimethylolpropane trimethacrylate, or the like may be used in combination as another monomer.

Also, the vinyl resin may be a resin produced by using the monomers alone or a copolymer resin produced by using two or more monomers.

When the monomers used for the resin constituting the vinyl resin particles contains styrene, the ratio of styrene in the total monomer content is preferably 20% by mass or more and 100% by mass or less and more preferably 40% by mass or more and 100% by mass or less.

The average particle diameter of the resin particles is not particularly limited. The average particle diameter of the resin particles is, for example, 0.1 µm or more and 0.5 µm or less, preferably 0.25 µm or more and 0.5 µm or less, and more preferably 0.25 µm or more and 0.4 µm or less. With the resin particles having an average particle diameter within the range, the productivity of the resin particles is improved, and aggregation is easily suppressed.

The average particle diameter of the resin particles is determined by using the particle size distribution measured with a laser diffraction particle size distribution analyzer (for example, COULTER COUNTER LS13 (manufactured by Beckman Coulter, Inc.)). In this case, a volume-based cumulative distribution is drawn vs. divided particle diameter ranges (channels) from the small particle diameter side. The particle diameter at 50% cumulation of the total particles is measured as the volume-average particle diameter D50v.

The resin particles of a resin other than the polyimide resin soluble in a solvent which does not dissolve the polyimide resin are preferably, for example, uncrosslinked resin particles having an uncrosslinked structure, but may be crosslinked within the range having solubility. Specific examples of the resin particles include polymethyl methacrylate (MB-series, manufactured by Sekisui Plastics Co., Ltd.), (meth)acrylate-styrene copolymer (FS-series, manufactured by Nipponpaint Co., Ltd.), polystyrene, and the like. When the resin particles are used, the resin particles may be washed before use.

Also, if required, a water-soluble resin may be added, and examples thereof include acetal resins such as polyvinyl butyral resin and the like, polyamide resins such as nylon and the like, acrylic resins, vinyl resins such as a polyvinyl chloride resin, a polyvinylidene chloride resin, and the like, polyurethane resins, polyvinyl pyrrolidone, polyethylene glycol, polyvinyl alcohol, and the like.

The content of the resin particles in the resin particle-dispersed polyimide precursor solution is within a range of 20% by mass or more and 600% by mass or less (preferably 25% by mass or more and 500% by mass or less and more preferably 30% by mass or more and 400% by mass or less) relative to 100% by mass of the polyimide precursor solid content in the polyimide precursor solution.

(Other Additives)

In the method for producing the porous polyimide film according to the exemplary embodiment of the present disclosure, the polyimide precursor solution may contain a catalyst for promoting imidization reaction, and a leveling agent for improving film quality, etc.

Examples of the catalyst for promoting imidization reaction include acid catalysts such as a dehydrant such as an acid anhydride or the like, a phenol derivative, a sulfonic acid derivative, a benzoic acid derivative, and the like.

Also, for example, a conductive material (for example, conductivity (for example, a volume resistivity of less than $10^7$ Ω·cm or semiconductivity (for example, a volume resistivity of $10^7$ Ω·cm or more and $10^{13}$ Ω·cm or less)) added for imparting conductivity may be contained.

Examples of the conductive material include carbon black (for example, acid carbon black at pH 5.0 or less); metals (for example, aluminum, nickel, and the like); metal oxides (for example, yttrium oxide, tin oxide, and the like); ion-conductive materials (for example, potassium titanate, LiCl, and the like); and the like. These conductive materials may be used alone or in combination of two or more.

Also, the polyimide precursor solution may contain the inorganic particles added for improving mechanical strength according to the purpose of use of the porous polyimide film. Examples of the inorganic particles include particle materials such as a silica powder, an alumina powder, a barium sulfate powder, a titanium oxide powder, mica, talc, and the like. Also, $LiCoO_2$, $LiMn_2O$, or the like, which is used as an electrode of a lithium ion battery, may be contained.

—Method for Preparing Polyimide Precursor Solution—

A method for preparing the polyimide precursor solution is not particularly limited, but the following preparation method can be used.

An example of the method for preparing the polyimide precursor solution includes polymerizing, in the aqueous solvent, the tetracarboxylic dianhydride with the diamine compound in the presence of the organic amine compound, producing a resin (polyimide precursor).

This method uses the aqueous solvent and is thus useful in view of high productivity and simplification of the process due to the one-stage preparation of the polyimide precursor solution.

Another example of the method includes polymerizing, in an organic solvent such as an aprotic polar solvent (for example, N-methyl pyrrolidone (NMP) or the like), the tetracarboxylic dianhydride with the diamine compound, producing a resin (polyimide precursor), and then adding to an aqueous solvent such as water, alcohol, or the like, precipitating a resin (polyimide precursor). Then, the polyimide precursor and the organic amine compound are dissolved in the aqueous solvent to prepare the polyimide precursor solution.

<Separator of Lithium Ion Secondary Battery and Lithium Ion Secondary Battery>

Next, description is made of a separator of a lithium ion secondary battery and a lithium ion secondary battery to each of which the porous polyimide film according to the exemplary embodiment of the present disclosure is applied.

A separator of a lithium ion secondary battery according to an exemplary embodiment of the present disclosure contains the porous polyimide film according to the exemplary embodiment of the present disclosure. Also, a lithium ion secondary battery according to an exemplary embodiment of the present disclosure contains the porous polyimide film according to the exemplary embodiment of the present disclosure. Description is made below with reference to FIG. 2.

Figure 2:
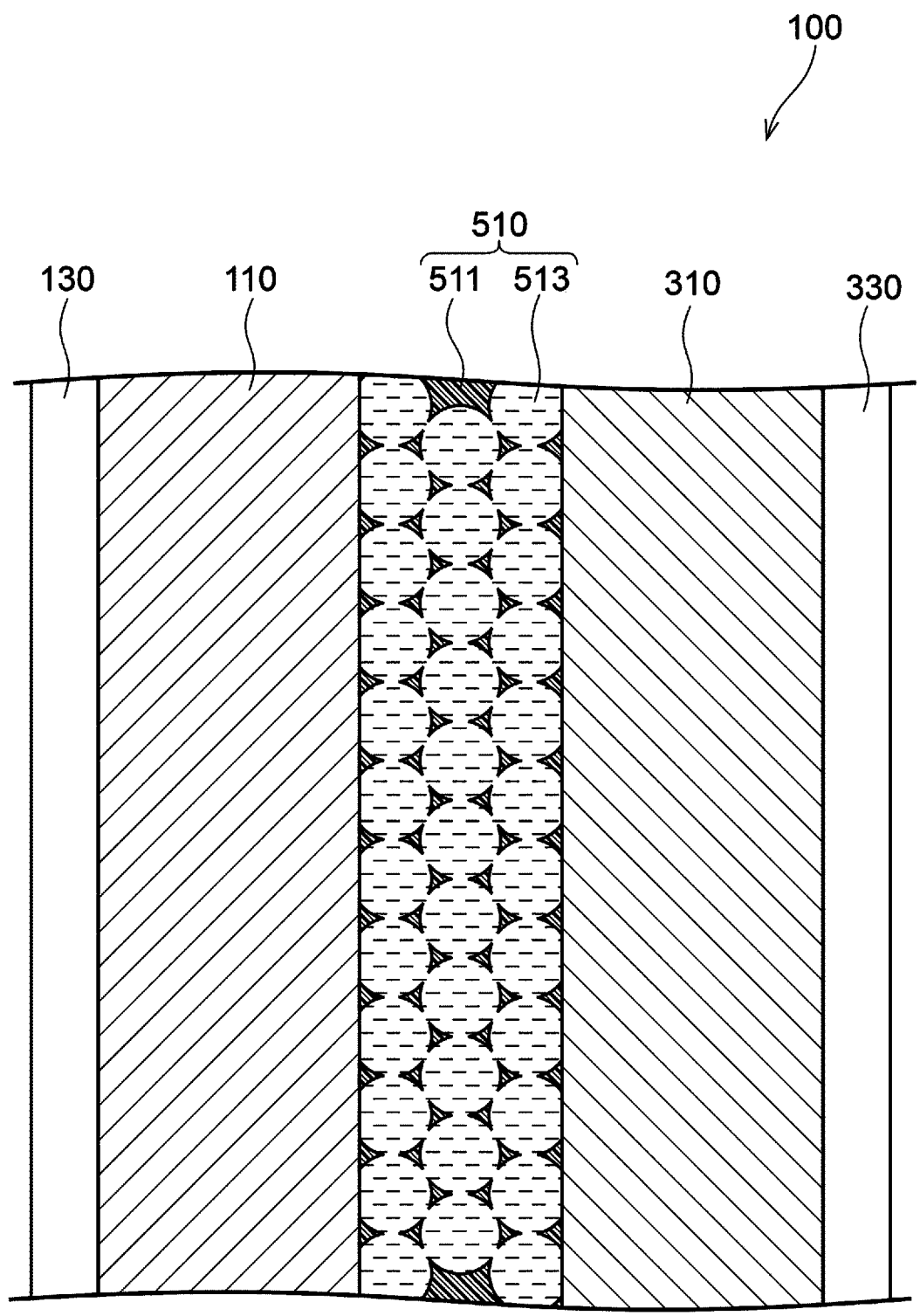
FIG. 2 is a schematic partial sectional view showing an example of a lithium ion secondary battery according to an exemplary embodiment of the present disclosure.

FIG. 2 is a partial schematic sectional view showing an example of the lithium ion secondary battery according to the exemplary embodiment of the present disclosure. As shown in FIG. 2, a lithium ion secondary battery 100 includes a positive electrode active material layer 110, a separator layer 510, and a negative electrode active material 310, which are housed in an outer member not shown in the drawing. The positive electrode active material layer 110 is provided on a positive electrode current collector 130, and the negative electrode active material layer 310 is provided on a negative electrode current collector 330. The separator layer 510 is provided so as to separate between the positive electrode active material layer 110 and the negative electrode active material layer 310 and is disposed between the positive electrode active material layer 110 and the negative electrode active material layer 310 so that the positive electrode active material layer 110 and the negative electrode active material layer 310 face each other. The separator layer 510 includes a separator 511 and an electrolytic solution 513 filled in pores of the separator 511. The porous polyimide film according to the exemplary embodiment of the present disclosure is applied to the separator 511. The positive electrode current collector 130 and the negative electrode current collector 330 are members provided according to demand.

(Positive Electrode Current Collector 130 and Negative Electrode Current Collector 330)

Materials used for the positive electrode current collector 130 and the negative electrode current collector 330 are not particularly limited as long as they are known conductive materials. Usable examples thereof include metals such as aluminum, copper, nickel, titanium, and the like.

(Positive Electrode Active Material Layer 110)

The positive electrode active material layer 110 is a layer containing a positive electrode active material. If required, the positive electrode active material layer 110 may contain known additives such as a conductive auxiliary agent, a binder resin, etc. The positive electrode active material is not particularly limited, and a known positive electrode active material can be used. Examples thereof include lithium-containing composite oxides ($LiCoO_2$, $LiNiO_2$, $LiMnO_2$, $LiMn_2O_4$, $LiFeMnO_4$, $LiV_2O_5$, and the lie), lithium-containing phosphate salts ($LiFePO_4$, $LiCoPO_4$, $LiMnPO_4$, $LiNiPO_4$, and the like), conductive polymers (polyacetylene, polyaniline, polypyrrole, polythiophene, and the like), and the like. The positive electrode active materials may be used alone or in combination of two or more.

(Negative Electrode Active Material Layer 310)

The negative electrode active material layer 310 is a layer containing a negative electrode active material. If required, the negative electrode active material layer 310 may contain known additives such as a binder resin etc. The negative electrode active material is not particularly limited, and a known negative electrode active material can be used. Examples thereof include carbon materials (graphite (natural graphite and artificial graphite), carbon nanotubes, graphitized carbon, low-temperature fired carbon, and the like), metals (aluminum, silicon, zirconium, titanium, and the like), metal oxides (tin dioxide, lithium titanate, and the like), and the like. The negative electrode active materials may be used alone or in combination of two or more.

(Electrolytic Solution 513)

The electrolytic solution 513 is, for example, a nonaqueous electrolytic solution containing an electrolyte and a nonaqueous solvent.

Examples of the electrolyte include electrolytes of lithium salts ($LiPF_6$, $LiBF_4$, $LiSbF_6$, $LiAsF_6$, $LiClO_4$, $LiN(FSO_2)_2$, $LiN(CF_3SO_2)_2$, $LiN(C_2F_5SO_2)$, $LiC(CF_3SO_2)_3$, and the like). The electrolytes may be used alone or in combination of two or more.

Examples of the nonaqueous solvent include cyclic carbonates (ethylene carbonate, propylene carbonate, butylene carbonate, and the like), chain carbonates (diethyl carbonate, dimethyl carbonate, ethylmethyl carbonate, methyl acetate, ethyl acetate, methyl propionate, ethyl propionate, γ-butyrolactone, 1,2-dimethoxyethane, 1,2-diethoxyethane, and the like), and the like. The nonaqueous solvents may be used alone or in combination of two or more.

(Method for Producing Lithium Ion Secondary Battery 100)

An example of the method for producing the lithium ion secondary battery 100 is described.

First, a coating solution for forming the positive electrode active material layer 110 containing the positive electrode active material is applied and dried on the positive electrode current collector 130 to produce a positive electrode including the positive electrode active material layer 110 provided on the positive electrode current collector 130.

Similarly, a coating solution for forming the negative electrode active material layer 310 containing the negative electrode active material is applied and dried on the negative electrode current collector 330 to produce a negative electrode including the negative electrode active material layer 310 provided on the negative electrode current collector 330. If required, each of the positive electrode and the negative electrode may be compressed.

Next, the separator 511 is disposed between the positive electrode active material layer 110 of the positive electrode and the negative electrode active material layer 310 of the negative electrode so that the positive electrode active material layer 110 of the positive electrode and the negative electrode active material layer 310 of the negative electrode face each other, forming a laminated structure. In the laminated structure, the positive electrode (the positive electrode current collector 130 and the positive electrode active material layer 110), the separator layer 510, and the negative electrode (the negative electrode active material layer 310 and the negative electrode current collector 330) are laminated in that order. If required, the laminated structure may be compressed.

Next, the laminated structure is housed in an outer member, and then the electrolytic solution 513 is injected into the laminated structure. The injected electrolytic solution 513 also permeates into the pores of the separator 511.

Thus, the lithium ion secondary battery 100 is produced.

The lithium ion secondary battery according to the exemplary embodiment of the present disclosure is described above with reference to FIG. 2. However, the lithium ion secondary battery according to the exemplary embodiment of the present disclosure is not limited to this. The form thereof is not particularly limited as long as the porous polyimide film according to the exemplary embodiment of the present disclosure is applied.

<All-Solid-State Battery>

Next, an all-solid-state battery using the porous polyimide film according to the exemplary embodiment of the present disclosure is described blow with reference to FIG. 3.

FIG. 3 is a partial schematic sectional view showing an example of the all-solid-state battery according to the exemplary embodiment of the present disclosure. As shown in FIG. 3, an all-solid-state battery 200 includes a positive electrode active material layer 220, a solid electrolyte layer 620, and a negative electrode active material layer 420, which are housed in an outer member not shown in the drawing. The positive electrode active material layer 220 is provided on a positive electrode current collector 240, and the negative electrode active material layer 420 is provided on a negative electrode current collector 440. The solid electrolyte layer 620 is disposed between the positive electrode active material layer 220 and the negative electrode active material layer 420 so that the positive electrode active material layer 220 and the negative electrode active material layer 420 face each other. The solid electrolyte layer 620 includes a solid electrolyte 624 and a holding body 622 which holds the solid electrolyte 624, and the pores of the holding body 622 are filled with the solid electrolyte 624. The porous polyimide film according to the exemplary embodiment of the present disclosure is applied as the holding body 622 which holds the solid electrolyte 624. The positive electrode current collector 240 and the negative electrode current collector 440 are members provided according to demand.

(Positive Electrode Current Collector 240 and Negative Electrode Current Collector 440)

Examples of the materials used for the positive electrode current collector 240 and the negative electrode current collector 440 include the same materials as those described above for the lithium ion secondary battery.

(Positive Electrode Active Material Layer 220 and Negative Electrode Active Material Layer 420)

Examples of the materials used for the positive electrode active material layer 220 and the negative electrode active material layer 420 include the same materials as those described above for the lithium ion secondary battery.

(Solid Electrolyte 624)

The solid electrolyte 624 is not particularly limited, and a known solid electrolyte can be used. Examples thereof include a polymer solid electrolyte, an oxide solid electrolyte, a sulfide solid electrolyte, a halide solid electrolyte, a nitride solid electrolyte, and the like.

Examples of the polymer solid electrolyte include fluorocarbon resins (homopolymers such as polyvinylidene fluoride, polyhexafluoropropylene, polytetrafluoroethylene, and the like, copolymers each having these as constituent units, and the like), polyethylene oxide resins, polyacrylonitrile resins, polyacrylate resins, and the like. The sulfide solid electrolyte is preferably contained in view of excellent lithium ion conductivity. In view of the same, the sulfide solid electrolyte containing, as a constituent element, at least one of sulfur, lithium, and phosphorus is preferably used.

The oxide solid electrolyte is, for example, particles of a lithium-containing oxide solid electrolyte. Examples thereof include $Li_2O-B_2O_3-P_2O_5$, $Li_2O-SiO_2$, and the like.

The sulfide solid electrolyte is, for example, a sulfide solid electrolyte containing, as a constituent element, at least one of sulfur, lithium, and phosphorus. Examples thereof include $8Li_2O.67Li_2S.25P_2S_5$, $Li_2S$, $P_2S_5$, $Li_2S-SiS_2$, $LiI-Li_2S-SiS_2$, $LiI-Li_2S-P_2S_5$, $LiI-Li_3PO_4-P_2S_5$, $LiI-Li_2S-P_2O_5$, $LiI-Li_2S-B_2S_3$, and the like.

Examples of the halide solid electrolyte include LiI and the like.

Examples of the nitride solid electrolyte include $Li_3N$ and the like.

(Method for Producing All-Solid-State Battery 200)

An example of a method for producing the all-solid-state battery 200 is described.

A coating solution for forming the positive electrode active material layer 220 containing a positive electrode active material is applied and dried on the positive electrode current collector 240 to produce a positive electrode including the positive electrode active material layer 220 provided on the positive electrode current collector 240.

Similarly, a coating solution for forming the negative electrode active material layer 420 containing a negative electrode active material is applied and dried on the negative electrode current collector 440 to produce a negative electrode including the negative electrode active material layer 420 provided on the negative electrode current collector 440.

If required, each of the positive electrode and the negative electrode may be compressed.

Next, a coating solution for forming the solid electrolyte layer 620, which contains the solid electrolyte 624, is applied and dried on a substrate to form a layered solid electrolyte.

Next, a porous polyimide film serving as the holding body 622 and the layered solid electrolyte 624 are superposed as a material for forming the solid electrolyte layer 620 on the positive electrode active material layer 220 of the positive electrode. Further, the negative electrode is superposed on the material for forming the solid electrolyte layer 620 so that the negative electrode active material layer 420 of the negative electrode faces the positive electrode active material layer 220 side, forming a laminated structure. In the laminated structure, the positive electrode (the positive electrode current collector 240 and the positive electrode active material layer 220), the solid electrolyte layer 620, and the negative electrode (the negative electrode active material layer 420 and the negative electrode current collector 440) are laminated in that order.

Next, by compressing the laminated structure, the solid electrolyte 624 is impregnated into the pores of the porous polyimide film serving as the holding body 622, and the solid electrolyte 624 is held.

Next, the laminated structure is housed in an outer member.

Thus, the all-solid-state battery 200 is produced.

The all-solid-state battery according to the exemplary embodiment of the present disclosure is described above with reference to FIG. 3, but the all-solid-state battery is not limited to this. The form is not particularly limited as long as the porous polyimide film according to the exemplary embodiment of the present disclosure is applied.

EXAMPLES

Examples are described below, but the present disclosure is not limited to these examples. In addition, in description below, "parts" and "%" are on mass basis unless otherwise specified.

<Method for Producing Resin Particles>

—Resin Particles (1-1)—

First, 300 parts by mass of styrene, 11.9 parts by mass of surfactant DOWFAX 2A1 (47% solution, manufactured by Dow Chemical Company), and 150 parts by mass of deionized water are mixed and then stirred and emulsified by a dissolver at 1,500 revolutions for 30 minutes, forming a monomer emulsion. Then, 0.9 parts by mass of DOWFAX 2A1 (47% solution, manufactured by Dow Chemical Company) and 446.8 parts by mass of deionized water are added to a reactor. The resultant mixture is heated to 75° C. in a nitrogen stream, and then 24 parts by mass of the monomer emulsion is added to the mixture. Then, a polymerization initiator solution prepared by dissolving 5.4 parts by mass of ammonium persulfate in 25 parts by mass of deionized water is added dropwise over 10 minutes. After reaction for 50 minutes after dropwise addition, the remaining monomer emulsion is added dropwise over 180 minutes and further reacted for 180 minutes. Then, the reaction solution is cooled to produce a resin particle dispersion (1-1). The solid content concentration of the resin particle dispersion (1-1) is 36.0% by mass. Also, the resultant resin particles have an average particle diameter of 0.38 μm.

Examples 1 to 4 and Comparative Examples 1 to 3

(Production of Polyimide Precursor)

—Polyimide Precursor Solution (2-1)—

First, 3,3',4,4'biphenyltetracarboxylic dianhydride (also referred to as "BPDA" hereinafter), p-phenylenediamine (also referred to as "PDA" hereinafter), and deionized water are added at a ratio shown in Table, heated to 50° C., and then stirred. Then, N-methylmorpholine (also referred to as "MMO" hereinafter) is added dropwise over 1 hour, dissolved by stirring for 24 hours, and then reacted to prepare a polyimide precursor solution (2-1).

—Resin Particle-Dispersed Polyimide Precursor Solution (2-1)—

First, 47.1 parts of the resin particle dispersion (1-1), 47.3 parts of the polyimide precursor solution (2-1), and 5.6 parts of deionized water are mixed and then dispersed by ultrasonic waves at 50° C. for 30 minutes, preparing a resin particle-dispersed polyimide precursor solution (2-1).

The composition result of the resultant resin particle-dispersed polyimide precursor solution (2-1) is shown in Table 1.

—Resin Particle-Dispersed Polyimide Precursor Solution (2-2)—

A resin particle-dispersed polyimide precursor solution (2-2) is prepared by the same method as for preparing the resin particle-dispersed polyimide precursor solution (2-1) except that the mixing ratio is adjusted as shown in Table 1.

—Resin Particle-Dispersed Polyimide Precursor Solution (2-3)—

A resin particle-dispersed polyimide precursor solution (2-3) is prepared by the same method as for preparing the resin particle-dispersed polyimide precursor solution (2-1) except that the mixing ratio is adjusted as shown in Table 1.

—Resin Particle-Dispersed Polyimide Precursor Solution (2-4)—

A resin particle-dispersed polyimide precursor solution (2-4) is prepared by the same method as for preparing the resin particle-dispersed polyimide precursor solution (2-1) except that the mixing ratio is adjusted as shown in Table 1.

—Resin Particle-Dispersed Polyimide Precursor Solution (2-5)—

A resin particle-dispersed polyimide precursor solution (2-5) is prepared by the same method as for preparing the resin particle-dispersed polyimide precursor solution (2-1) except that the mixing ratio is adjusted as shown in Table 1.

TABLE 1

| | | BPDA (% by mass) | PDA (% by mass) | α value [BPDA/PDA] ratio | MMO (% by mass) | Deionized water (% by mass) |
|---|---|---|---|---|---|---|
| Resin particle-dispersed polyimide precursor solution (No.) | 2-1 | 72.1 | 27.9 | 6.95 | 74.4 | 492.3 |
| | 2-2 | 73.5 | 26.5 | 1.00 | 75.5 | 491.3 |
| | 2-3 | 74.1 | 25.9 | 1.05 | 76.4 | 490.3 |
| | 2-4 | 74.4 | 25.6 | 1.07 | 76.8 | 489.9 |
| | 2-5 | 75 | 25 | 1.10 | 77.3 | 489.4 |

(Formation of Porous Polyimide Film)
—Porous Polyimide Film (3-1)—

The resin particle-dispersed polyimide precursor solution (2-2) is applied on a glass plate so that the thickness is 100 μm and dried. Then, the particles are removed by firing at 390° C. for 1 hour to form a porous polyimide film.

The resultant porous polyimide film is immersed in 0.3 N nitric acid for 10 minutes at room temperature, then washed by immersion in deionized water for 10 minutes at room temperature, and dried by exhaust air to form a porous polyimide film (3-1).

The total content of the specific metal group in the resultant porous polyimide film (3-1) is measured by atomic absorption spectrometry. The result is shown in Table 2.

Also, the moisture absorption ratio of the porous polyimide film (3-1) is measured by a method described later. The result is shown in Table 2.

—Porous Polyimide Film (3-2)—

A porous polyimide film (3-2) is formed by the same method as for forming the porous polyimide film (3-1) except that the resin particle-dispersed polyimide precursor solution (2-3) is used. The results are shown in Table 2.

—Porous Polyimide Film (3-3)—

A porous polyimide film (3-3) is formed by the same method as for forming the porous polyimide film (3-1) except that the resin particle-dispersed polyimide precursor solution (2-4) is used. The results are shown in Table 2.

—Porous Polyimide Film (3-4)—

A porous polyimide film (3-4) is formed by the same method as for forming the porous polyimide film (3-1) except that the resin particle-dispersed polyimide precursor solution (2-5) is used. The results are shown in Table 2.

—Porous Polyimide Film (4-1)—

A porous polyimide film (4-1) is formed by the same method as for forming the porous polyimide film (3-1) except that the resin particle-dispersed polyimide precursor solution (2-1) is used. The results are shown in Table 2.

—Porous Polyimide Film (4-2)—

A porous polyimide film (4-2) is formed by immersing the porous polyimide film (3-1) in a 1N aqueous sodium hydroxide solution for 10 minutes and then washing with deionized water for 10 minutes. The results are shown in Table 2.

—Porous Polyimide Film (4-3)—

A porous polyimide film (4-3) is formed by the same method as for forming the porous polyimide film (3-1) except that the porous polyimide film is not treated with an acid. The results are shown in Table 2.

<Evaluation>

(Moisture Absorption Ratio)

The weight of the porous polyimide film formed in each of the examples is measured immediately after vacuum drying at 150° C. and after storage for 24 hours at 28° C. and a humidity of 80%. The moisture absorption ratio of each of the porous polyimide films is measured by calculating the ratio (%) of increase in weight. The results are shown in Table 2.

(Tensile Strength)

A sample of 5 mm×100 mm is prepared from the porous polyimide film formed in each of the examples, and the tensile strength of each of the porous polyimide films is measured by using a tensile tester (manufactured by Toyo Seiki Co., Ltd., STROGRAPH VI-C) under the condition of a distance between chucks of 60 mm and evaluated based on the following criteria. The results are shown in Table 2.

A: 20 N/mm$^2$ or more
B: 10 N/mm$^2$ or more and less than 20 N/mm$^2$
C: Less than 10 N/mm$^2$ (Propylene Carbonate Permeability)

On the porous polyimide film formed in each of the examples, 0.02 mL of propylene carbonate (also referred to as "PC") is dropped and allowed to stand for 30 seconds, and then the diameter of the permeation portion is measured to examine the permeability of propylene carbonate (PC) into each of the porous polyimide films. Evaluation is made based on the following criteria. The results are shown in Table 2.

A: Diameter of 12 mm or more
B: Diameter of 6 mm or more and less than 12 mm
C: Diameter of less than 6 mm (Electrolyte Injection Property)

On the porous polyimide film formed in each of the examples, 0.02 mL of an electrolytic solution (electrolyte: LiPF$_6$, solvent: volume ratio (ethylene carbonate/propylene carbonate) of 3/7) adjusted to an electrolyte concentration of 1 mol/L is dropped and allowed to stand for 5 minutes, and then the diameter of the permeation portion is measured to examine the injection property of the electrolytic solution into each of the porous polyimide films. Evaluation is made based on the following criteria. The results are shown in Table 2.

A: Diameter of 8 mm or more
B: Diameter of 4 mm or more and less than 8 mm
C: Diameter of less than 4 mm (Cycle Characteristic)

A lithium ion battery is produced by using the porous polyimide film formed in each of the examples. Next, a decease rate of battery capacity is measured by 500-times repeated charge and discharge (1 C charge and 1 C discharge at 25° C.). The lower the decrease rate, the more excellent the cycle characteristics. Evaluation is made based on the following criteria. The results are shown in Table 2.
  Good: Decrease rate of less than 15%
  Poor: Decrease rate of 15% or more

TABLE 2

| | Resin particle-dispersed polyimide precursor solution | | | | Porous polyimide film | | | | | | Evaluation | | | |
|---|---|---|---|---|---|---|---|---|---|---|---|---|---|---|
| | Resin particle No. | No. | No. | α value | Acid value (mgKOH/g) | Total amount of specific metal (ppm) | Moisture absorption ratio (%) | Air permeation speed (seconds) | Average thickness (μm) | Porosity (%) | Tensile strength (N/mm²) | PC permeability | Electrolyte injection property | Cycle characteristics |
| Example 1 | 1-1 | 2-2 | 3-1 | 1.00 | 7 | <10 | <0.1 | 19 | 25 | 68 | A | A | B | Good |
| Example 2 | 1-1 | 2-3 | 3-2 | 1.05 | 11 | <10 | <0.1 | 24 | 25 | 68 | A | A | A | Good |
| Example 3 | 1-1 | 2-4 | 3-3 | 1.07 | 16 | <10 | <0.1 | 23 | 25 | 65 | A | A | A | Good |
| Example 4 | 1-1 | 2-5 | 3-4 | 1.10 | 18 | 12 | <0.1 | 23 | 24 | 66 | B | A | A | Good |
| Comparative Example 1 | 1-1 | 2-1 | 4-1 | 0.95 | 3 | <10 | <0.1 | 19 | 24 | 67 | A | C | C | Good |
| Comparative Example 2 | 1-1 | 2-2 | 4-2 | 1.00 | 23 | 3600 | 2.1 | 22 | 26 | 60 | C | A | A | Poor |
| Comparative Example 3 | 1-1 | 2-2 | 4-3 | 1.00 | 7 | 210 | 0.6 | 20 | 25 | 67 | A | A | A | Poor |

The results shown in Table 2 indicate that the porous polyimide films formed in the examples have good wettability and high strength. While the porous polyimide film formed in the comparative examples are poor in either wettability and strength.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A porous polyimide film comprising:
the porous polyimide film having an acid value within a range of 7 mgKOH/g to 20 mgKOH/g determined by acid-base titration, containing a metal group including alkali metals excluding Li, alkaline earth metals, and silicon at a total content of 100 ppm or less relative to the porous polyimide film, and having a moisture absorption ratio of 0.5% or less.

2. The porous polyimide film according to claim 1, wherein the acid value is within a range of 12 mgKOH/g to 20 mgKOH/g.

3. The porous polyimide film according to claim 1, wherein the tensile strength of the porous polyimide film is within a range of 10 N/mm² to 100 N/mm².

4. The porous polyimide film according to claim 1, wherein an average thickness of the porous polyimide film is within a range of 10 μm to 1000 μm.

5. The porous polyimide film according to claim 1, wherein an average thickness of the porous polyimide film is within a range of 20 μm to 500 μm.

6. The porous polyimide film according to claim 1, wherein the air permeation speed of the porous polyimide film is 25 seconds or less.

7. The porous polyimide film according to claim 1, wherein a porosity of the porous polyimide film is within a range of 50% to 80%.

8. The porous polyimide film according to claim 1, wherein a molar ratio (structural unit derived from tetracarboxylic dianhydride/structural unit derived from diamine) of a structural unit derived from tetracarboxylic dianhydride to a structural unit derived from diamine, both constituting a polyimide resin of the porous polyimide film, is within a range of 1.00 to 1.15.

9. The porous polyimide film according to claim 8, wherein the molar ratio is within a range 1.06 to 1.15.

10. A porous polyimide film,
wherein a molar ratio (structural unit derived from tetracarboxylic dianhydride/structural unit derived from diamine) of a structural unit derived from tetracarboxylic dianhydride to a structural unit derived from diamine, both constituting a polyimide resin of the porous polyimide film, is within a range of 1.00 to 1.15, a total content of a metal group including alkali metals excluding Li, alkaline earth metals, and silicon is 100 ppm or less relative to the porous polyimide film, and a moisture absorption ratio of the porous polyimide film is 0.5% or less.

11. The porous polyimide film according to claim 10, wherein the molar ratio is within a range 1.06 to 1.15.

12. A battery comprising the porous polyimide film according to claim 1.

13. The battery according to claim 12, wherein the battery is selected from a lithium ion secondary battery and an all-solid-state battery.

14. The battery according to claim 13, wherein the porous polyimide film is a separator, and the battery is a lithium ion secondary battery.

\* \* \* \* \*